United States Patent [19]
Kleinschmit et al.

[11] 4,166,550
[45] Sep. 4, 1979

[54] INSTALLATION FOR VENTING FUEL TANKS, ESPECIALLY FOR MOTOR VEHICLES

[75] Inventors: Einhard Kleinschmit, Esslingen; Dieter Scheurenbrand, Nellingen, both of Fed. Rep. of Germany

[73] Assignee: Daimler-Benz Aktiengesellschaft, Fed. Rep. of Germany

[21] Appl. No.: 635,795

[22] Filed: Nov. 28, 1975

[30] Foreign Application Priority Data

Nov. 30, 1974 [DE] Fed. Rep. of Germany ....... 2456726

[51] Int. Cl.² ...................... B65D 25/00; F16K 45/00
[52] U.S. Cl. ................................ 220/85 VR; 220/20; 220/85 VS; 220/86 R
[58] Field of Search ................... 220/20, 85 R, 85 VR, 220/85 S, 86 R

[56] References Cited

U.S. PATENT DOCUMENTS

| 3,804,291 | 4/1974 | Fricker | 220/86 R |
|---|---|---|---|
| 3,817,421 | 6/1974 | Adres | 220/86 R |
| 3,907,153 | 9/1975 | Mutty | 220/86 R |

*Primary Examiner*—George E. Lowrance
*Attorney, Agent, or Firm*—Craig and Antonelli

[57] ABSTRACT

An installation for venting fuel tanks, in which a flow-interrupting chamber is provided in the upper part of the tank, to which are connected two vent lines; each vent line thereby extends from its connection with the flow-interrupting chamber at first toward the respective tank end and then back toward the opposite tank end; a vent line in communication with the atmosphere is also connected with the flow-interrupting chamber within the center area thereof.

14 Claims, 1 Drawing Figure

U.S. Patent  Sep. 4, 1979  4,166,550
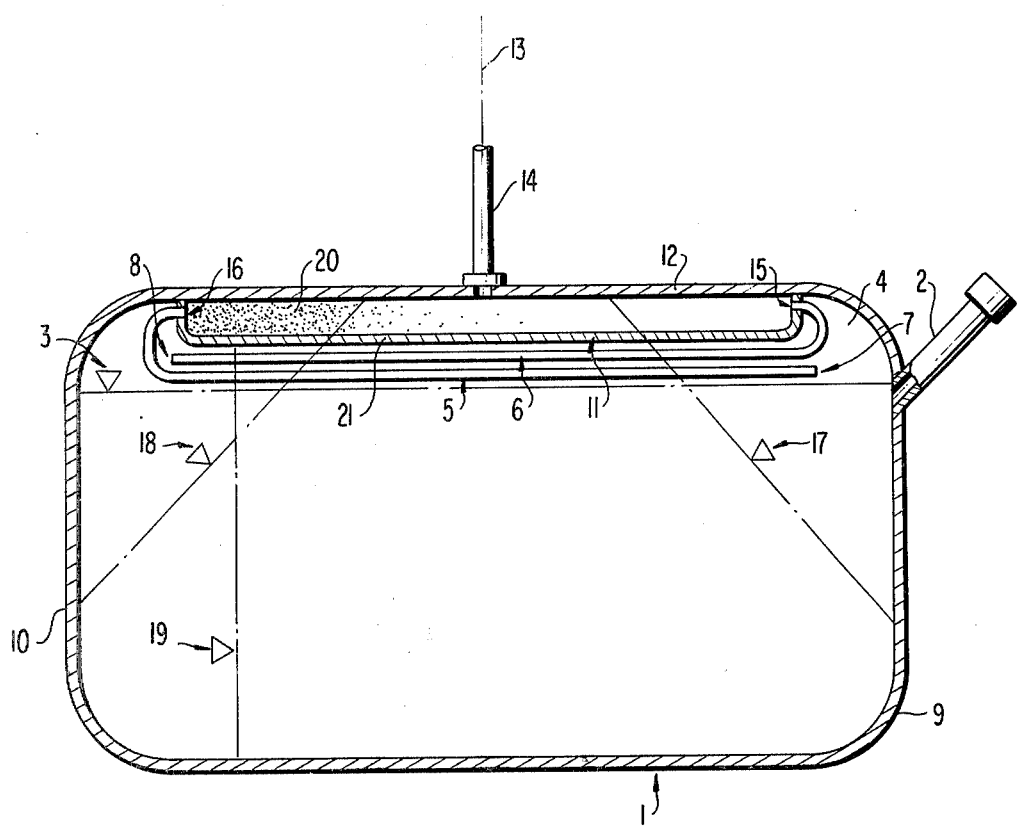

INSTALLATION FOR VENTING FUEL TANKS, ESPECIALLY FOR MOTOR VEHICLES

The present invention relates to an installation for venting fuel tanks, especially for motor vehicles, in which at least two vent lines disposed on the inside of the tank and terminating in the interior space of the tank at opposite ends of the tank or in proximity thereof are joined over the center area of the tank, and in which each vent line extends from its discharge opening into the tank interior space toward an opposite end of the tank and from the latter extends again back to the junction with the other vent line located near the tank upper portion within the interior space of the tank.

These types of installations are advantageous, among other reasons, because in the inclined positions of the tank, the fuel which has entered into one of the vent lines up to the junction, at first enters into the other vent line located on the inside of the tank and with a change of the tank position back into the normal position, the fuel is conducted back into the tank interior space. As a result thereof, a collecting vessel or tank is no longer necessary. Furthermore, the structural expenditures of such installations are small since only the vent line in communication with the atmosphere is extended away from the tank and the tank only has to have one opening for the vent line.

In one prior art installation of the type with which the present invention is concerned (German Offenlegungsschrift No. 2,045,004), corresponding to U.S. Pat. No. 3,817,421, the two line sections are connected at the place of their junction directly both with each other as also with the vent line terminating in the atmosphere so that after a turning-over of the vehicle and with a subsequent position of the vehicle on its side, fuel continues to run out of the tank by way of the vent line terminating in the atmosphere until the junction and the fuel level in the tank are located at the same geodetic height. This undesired effect is possible because during the turning over, both vent lines located on the inside of the tank will fill with fuel and in the position of the tank on its side, a hydraulic siphoning effect occurs within the vent line located on the inside of the tank and terminating in the tank interior space below the fuel level.

A prior art installation of a different type (German Offenlegungsschrift No. 1,505,709) which does not fall within the category with which the present invention is concerned, is provided with two vent lines located in the interior space of the tank, which terminate in the tank interior space at opposite tank ends and are extended from the tank ends directly to a collecting pot which is also arranged in the interior space of the tank and is retained at a central place of the tank ceiling wall. In this prior art installation, no return of fuel takes place by way of one of the vent lines terminating in the tank interior space so that a vent line connecting the collecting pot with the atmosphere is required, which prior to its discharge into the atmosphere has to be extended to a geodetically considerably higher place than the tank in order to avoid the escape of fuel into the atmosphere.

The present invention is concerned with the task to avoid the escape of fuel in an installation of the aforementioned type, even if the vehicle has turned over and subsequently assumes a position on its side.

The underlying problems are solved according to the present invention in that the junction is constructed as flow-interrupting vessel or chamber, to which is connected the vent line in communication with the atmosphere, and in that the vessel or chamber openings of the flow-interrupting vessel for the connection of the vent lines are each located in proximity of that tank end, to which the respective vent line extends from its discharge opening in the tank interior space.

In the installation according to the present invention, no fuel can escape out of the tank even in a position of the vehicle on its side, after the vehicle had turned over, because one vent line located on the inside of the tank necessarily terminates in the tank interior space above the fuel level and the air bubble of the flow-interrupting chamber or vessel will necessarily locate itself at that connection of the flow-interrupting vessel which is connected with the vent line terminating in the tank interior space below the fuel level, whereby this connection also lies above the fuel level. A hydraulic siphoning effect is avoided in this manner.

Slight fuel quantities which might dynamically be further conducted into the vent lines located on the inside of the tank by a reversal of direction during the drive under zig zagging conditions, collect in the flow-interrupting vessel or chamber out of which takes place a return of fuel by way of one or both of the vent lines located on the inside of the tank into the tank interior space after the termination of the zig zag or curve drive.

In the installation according to the present invention, the flow-interrupting vessel does not have the function of volume compensation for the thermal expansion of the fuel, but instead serves above all to entrap an air bubble in all tank positions in order to intercede undesired fuel flows in the vent lines.

Accordingly, it is an object of the present invention to provide an installation for venting fuel tanks which avoids by simple means the afore-mentioned shortcomings and drawbacks encountered in the prior art.

Another object of the present invention resides in an installation for venting fuel tanks, especially for motor vehicles, in which the structural expenditures are relatively small, yet the danger of escape of fuel is eliminated even after the vehicle turns over and lands on its side.

A further object of the present invention resides in an installation for venting fuel tanks, in which a hydraulic siphoning effect is effectively avoided regardless of the position of the vehicle, even after an accident.

These and further objects, features, and advantages of the present invention will become more apparent from the following description when taken in connection with the accompanying drawing which shows, for purposes of illustration only, one embodiment in accordance with the present invention, and wherein:

The single FIGURE is a schematic vertical cross-sectional view, through a fuel tank in accordance with the present invention, taken in a plane perpendicular to the vehicle longitudinal axis.

Referring now to the single figure of the drawing, this figure illustrates a fuel tank generally designated by reference numeral 1 having a fill-in pipe 2, by means of which is determined the highest fuel level 3. Two vent lines generally designated by reference numerals 5 and 6 are fixedly arranged above the fuel level 3 in the interior space 4 of the tank 1, whose line ends generally designated by reference numerals 7 and 8 terminating in the interior space 4 are located at opposite ends 9 and 10 of the tank 1. A flow-interrupting chamber of vessel generally designated by reference numeral 11 is additionally arranged within the interior space 4 above the fuel level 3, which is secured at the tank ceiling wall 12 and which is connected in a center place 13 of the ceiling wall 12 with an external vent line 14 in communication with the atmosphere which terminates in the atmosphere below the tank 1. The flow-interrupting chamber or vessel 11 is provided at its vessel ends arranged in proximity to the tank ends 9 and 10 with one vessel or chamber connection 15 and 16 each for its connection with the vent lines 5 and 6. From its line end 7 terminating in the interior space 4, the vent line 5 is initially extended to the opposite tank end 10 and subsequently back to the line connection 16. A corresponding line configuration is also made for the vent line 6 connected with the line connection 15 which initially extends from its line end 8 terminating in the interior space 4 toward the opposite tank end 9 and subsequently back to the line connection 15. A fuel level which will establish itself with maximum tank filling in a right or left curve, is indicated by reference numeral 17 and 18, respectively.

In case of lateral inclined positions of the tank 1 at least one of the line ends 7 and 8 is located above the respective fuel level so that the tank interior space 4 is necessarily connected by way of the respective vent line 5 and/or 6 and the flow-interrupting chamber or vessel 11 with the vent line 14 connected to atmosphere.

The particular advantage of the arrangement of the vessel connections 15 and 16 in proximity to the tank ends 9 and 10 opposite the associated line ends 8 and 7 can be explained as follows:

When the vehicle turns over, the tank 1 temporarily assumes a head stand or inverted position, in which the tank ceiling wall 12 is located geodetically below the vessel bottom 21 of the flow-interrupting vessel 11 and in which the air bubble indicated at 20 is located in the vertical area between the vessel connections 15 and 16 and the vessel bottom 21. The vent lines 5 and 6 and the remaining interior space of the flow-interrupting vessel 11 will fill with fuel. Since the discharge opening of the external vent line 14 on the side of the atmosphere is geodetically located above the fuel level in the head-stand or inverted position, no fuel can escape. When the vehicle, after turning over, reaches a position on its side in which, for example, the tank end 9 is geodetically located under the tank end 10, a maximum fuel level 19 may establish itself with a maximum tank filling, whereby the air bubble 20 moves toward the vessel connection 16 of the vent line 5 terminating with its line end 7 below the fuel level in the tank interior space, which vessel connection 16 is located above the fuel level also with this fuel level 19 by reason of its arrangement near the tank end, and thus a hydraulic siphoning effect in this line is prevented and any siphoning action which occurs when the vehicle assumes the position on its side, is interrupted. It is avoided in this manner that the fuel level 19 can drop to the geodetic level 13.

When driving through a right curve, the fuel level 17 may establish itself so that a partial fuel quantity enters into the vent line 6 by way of the discharge opening 8. As a result of a direct transition from the right curve into a left curve (zig-zagging), this partial fuel quantity may be forced by centrifugal force effect completely or partly into the flow-interrupting chamber or vessel 11 by way of the line connection 15 (pumping effect), which prevents for this case that this partial fuel quantity can escape by way of the vent line 14 connected to the atmosphere. The flow-interrupting chamber or vessel 11 operates correspondingly during a transition from a left curve (fuel level 18) into a right curve.

In case of several successive zig zag maneuvers, fuel collects temporarily in the flow-interrupting vessel 11. A capacity for the flow-interrupting vessel 11 which is also sufficient under these conditions, is assured if the flow cross section thereof is at least four to five times larger than the flow cross section of a vent line 5 and 6.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for venting fuel tanks, comprising at least two internal vent line means which terminate at respective discharge openings in the interior space of a fuel tank at least in proximity of opposite ends of the tank, said two internal vent line means being operatively connected together within the central area of the tank, a junction means located in the tank interior space near the tank upper portion, and each internal vent line means extending from its discharge opening in the interior space of the tank toward an opposite end of the tank and from the latter toward said junction means, said junction means being constructed as flow-interrupting chamber means, an external vent line in communication with the atmosphere being operatively connected with the flow-interrupting chamber means, and opening means for connecting said flow-interrupting chamber means with said two internal vent line means, said opening means being in proximity with the opposite ends of the tank.

2. An installation according to claim 1, wherein said external vent line is connected with the flow-interrupting chamber means within the center area thereof.

3. An installation according to claim 2, wherein said opening means are arranged in the flow-interrupting chamber means at opposite sides of said chamber means which face said opposite ends of the tank, a respective one of said internal vent line means being connected to a corresponding opening of said opening means and extending from said opening toward the nearer tank end and thereupon being returned upon itself and extending toward the opposite tank end.

4. An installation according to claim 3, wherein said flow-interrupting chamber means is secured to the top wall of the tank which forms a part thereof.

5. An installation according to claim 4, wherein said external vent line terminates in the atmosphere at a geodetic level below the level of fuel in the tank at a maximum filling of the tank.

6. An installation according to claim 5, wherein the bottom wall of the flow-interrupting chamber means is located above the maximum level of the fuel at maximum filling of the tank in the normal position of the tank in such a manner that said internal vent line means can extend within the space between the maximum fuel-filling level and the bottom wall of the chamber means.

7. An installation according to claim 6, wherein the flow cross section of said flow-interrupting chamber means is at least about four times the flow cross section of a respective one of said internal vent line means.

8. An installation according to claim 1, wherein said flow-interrupting chamber means is provided with end walls in proximity and facing the opposite tank ends, said opening means having openings provided in said end walls.

9. An installation according to claim 1, wherein said flow-interrupting chamber means is secured to the top wall of the tank which forms a part thereof.

10. An installation according to claim 1, wherein said external vent line terminates in the atmosphere at a geodetic level below the level of fuel in the tank at a maximum filling of the tank.

11. An installation according to claim 1, wherein the flow cross section of said flow-interrupting chamber means is at least about four times the flow cross section of a respective one of said internal vent line means.

12. In a venting arrangement for fuel tanks which comprises two internal vent lines operatively connected within a fuel tank, and an external vent line operatively connected to said two internal vent lines and communicated with the atmosphere, wherein the improvement comprises means for preventing siphon effects of fuel from said fuel tank through said vent lines to the atmosphere, said means including flow-interrupting chamber means for interrupting the flow of fuel between said vent lines,
  wherein said flow-interrupting chamber means includes an enclosed vessel arranged in said fuel tank above the maximum fuel level in said tank, said enclosed vessel communicating with the atmosphere by means of said external vent line and communicating with the interior of said fuel tank by means of said two internal vent lines, said two internal vent lines being respectively connected to said vessel at opposite side walls of said vessel which are in proximity with opposite end walls of said fuel tank such that respective connections can be located above the maximum fuel level in said tank when said tank is disposed at least partially on its side.

13. A venting arrangement according to claim 12, wherein the flow cross section of said vessel is at least about four times the flow cross section of the respective internal vent lines.

14. A venting arrangement according to claim 12, wherein said external vent line is connected to said enclosed vessel at the top central portion thereof, and said external vent line terminates in the atmosphere at a geodetic level below the maximum fuel level in said tank.

* * * * *